(12) United States Patent
Kobylkin

(10) Patent No.: US 10,445,787 B2
(45) Date of Patent: Oct. 15, 2019

(54) PREDICTING MERCHANT BEHAVIOR USING MERCHANT WEBSITE TERMS

(71) Applicant: PAYPAL, INC., San Jose, CA (US)

(72) Inventor: Egor Kobylkin, Berlin (DE)

(73) Assignee: PAYPAL, INC., San Jose, CA (US)

( * ) Notice: Subject to any disclaimer, the term of this patent is extended or adjusted under 35 U.S.C. 154(b) by 946 days.

(21) Appl. No.: 14/961,727

(22) Filed: Dec. 7, 2015

(65) Prior Publication Data

US 2017/0161790 A1    Jun. 8, 2017

(51) Int. Cl.
*G06Q 30/02*    (2012.01)

(52) U.S. Cl.
CPC ..... *G06Q 30/0273* (2013.01); *G06Q 30/0277* (2013.01)

(58) Field of Classification Search
None
See application file for complete search history.

(56) References Cited

U.S. PATENT DOCUMENTS

| | | | |
|---|---|---|---|
| 2015/0106260 A1* | 4/2015 | Andrews | G06Q 20/4016 705/39 |
| 2016/0232540 A1* | 8/2016 | Gao | G06Q 30/0201 |

\* cited by examiner

*Primary Examiner* — Patricia H Munson
(74) *Attorney, Agent, or Firm* — Haynes and Boone, LLP

(57) ABSTRACT

There are provided systems and methods for predicting merchant behavior using merchant website terms. A payment provider may provide payment services for merchants. The payment services may be used by users to provide payments to the merchants. The payment provider may further process interfaces provided by the merchant, such as website interfaces, webpages, and/or dedicated application interfaces to determine terms used on the interfaces, such as words, sentences, and graphics. The payment provider may associate the terms with analytics for each of the merchants, including the merchant type, total payment volume, and other merchant data. Using the processed term data, the payment provider may identify prospective merchants that may wish to utilize the payment provider's services. Additionally, the payment provider may provide analytics to the prospective merchants and/or update the payment provider's currently enrolled merchants with additional analytics and information based on the term information.

20 Claims, 5 Drawing Sheets

US 10,445,787 B2

PREDICTING MERCHANT BEHAVIOR USING MERCHANT WEBSITE TERMS

TECHNICAL FIELD

The present application generally relates to predictive analysis using website data and more specifically to predicting merchant behavior using merchant website terms.

BACKGROUND

An online service provider may offer various services to one or more merchants in connection with operation of online websites or mobile applications, such as processing payments to the merchants by consumers. For example, the payment services may be used to provide a payment to the merchant for a transaction using a consumer's payment account with the payment provider or other payment instrument (e.g., a credit/debit card, a banking account, a gift card, etc.). The payment provider may also assist the merchant with other services, such as checkout and shopping services. Such features may be implemented in a website and/or dedicated application of the merchant through software development kits and/or other processes offered by the payment provider. However, in order to implement these systems into a merchant's website or application, the payment provider and merchant must be aware of each other and their corresponding systems. For example, the merchant must be aware that the payment provider offers certain payment processes. Moreover, in order to provide targeted advertising to the merchant of the payment provider's services that would be ideal for use in the merchant's shopping experience, the payment provider must have knowledge of the merchant's current systems and offerings. While general advertising by the payment provider may assist the payment provider is receiving more brand recognition, merchants may still be unaware of all of the features of the payment provider that may optimize the merchant's shopping experience to consumers. Furthermore, merchants may not be aware of how to change their website or consumer experience to increase effectiveness of the website.

Figure 1:
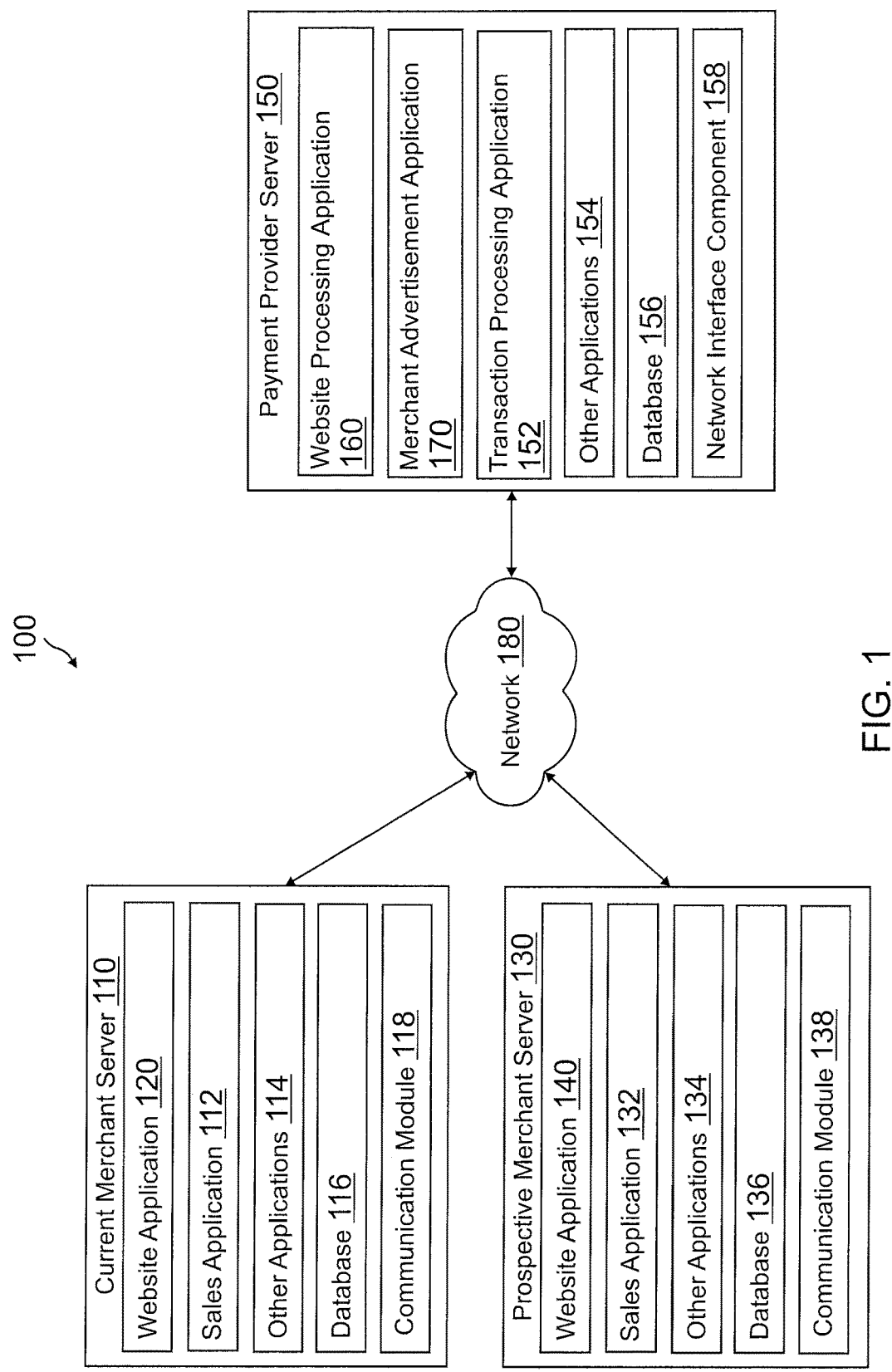
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for predicting merchant results using merchant website terms. Systems suitable for practicing methods of the present disclosure are also provided.

A service provider, such as a payment provider, may offer services to various merchants for use by the merchants to provide a shopping experience to consumers. Various services offered to merchants may include shopping interfaces and/or marketplaces that may assist the user in finding one or more products, goods, and/or services (referred to herein as an "item" or "items") for sale by the merchant. The processes may further include checkout and payment processes that may be used to select items for purchase, generate a transaction for the items, provide payment for the items, and arrange delivery, pick-up, or other retrieval of the items by the user. Such processes may be offered by back-end processing systems of the payment provider (e.g., server and/or database components and processing features), as well as features that may be implemented into a website or dedicated application of the merchant through software and other processes or information provided by the payment provider. In other embodiments, different service providers may also use similar processes as those described herein to provide various services to merchants or other entities.

The payment provider or other service provider may wish to advertise or otherwise market their services to existing and/or prospective customers of the payment/service provider. For example, customers of a payment provider may correspond to merchants utilizing the payment provider's services. In order to determine which merchants to advertise the payment provider's services and systems to, the payment provider may process website data for the payment provider's current merchant customers. The website data may correspond to a website of the merchant having text, images, and other data represented on the website of the merchant. In various embodiments, the payment provider may also further use data taken from a dedicated application (e.g., mobile device application) of the merchant. The payment provider may thus scan the websites (and/or dedicated applications) of the current merchant customers for the payment provider to pull the website data for processing. Once pulled, the payment provider may parse the data to determine text and other terms included on the merchant websites (and/or dedicated applications). The terms may include terms used by the merchant on their website, such as sales information for one or more items, payment and checkout information and process descriptions, and/or other merchant information appearing on the websites. The terms may also include text and information entered by users (e.g., the merchant's customers) to the website, including product reviews, forum postings, messages, service requests, and other types of information submitted by users to the merchant's website. The terms may correspond to a single text element, such as a character or word, as well as multiple text elements (e.g., a sentence). In various embodiments, the terms may further include visual images appearing on the merchant website, as well as logos and other graphics. Such images may be processed using image processing techniques to determine the content of the image, or may be matched to pre-existing images, such as similar logos, banners, and graphics used by merchants, payment providers, customer users, and/or service providers.

Once processed, the payment provider may determine a dictionary of terms occurring on the merchants' websites. The dictionary may include rankings of how often terms appear on the websites, on a percentage of the websites that the terms appear, and/or other analytic associated with the appearance of the terms on the merchant websites. The terms may provide an indication of the term's importance or prevalence of appearance on the merchant websites. For example, a term A may occur on every merchant website so that the term A provides a good indication that a website having the term would also be a merchant and potential customer of the payment provider. Similarly, a term B may occur multiple times on a medium to high percentage of the merchant websites (e.g., 75%) so that the term B also indicates that other website may be a potential merchant customer of the payment provider. In contrast, a term appearing only a few times and/or on a low percentage of the websites may not be indicative of a potential merchant customer of the payment provider. Thus, the number of times the term appears on a single website and across a plurality of merchant's websites may be important. In other embodiments, other data for the term may also be used to score or rank the term, or may provide other indications of how well the term performs in predicting behavior of other prospective merchant clients based on their website data. For example, the placement of a term on the website may be important (e.g., on the front webpage of a website or a sub-page of the website), a size or font of the term (e.g., terms with large size or prominent fonts so as to be visible), a color of the term, and/or a ratio of the term to other terms and elements on the website (e.g., if the term appears in a high ratio or where the term may appear in a low ratio due to a high volume of text and other terms presented on the website). The website data may also be pulled from previous merchant customers of the payment provider.

The payment provider may also determine a total payment volume by the merchant, which may correspond to a number, amount, and/or frequency of payments to the merchant by users (e.g., customers of the merchant). The total payment volume may be used to determine rankings for the merchants and how often the merchants use the payment provider or how much of the payment provider's systems the merchants use. The payment provider may also review each individual merchant to determine the payment processing services and other services/features of the payment provider that the merchant uses. Using this data, the payment provider may also correlate the terms with types of merchants and/or payment services used by the merchants. For example, a term C may be used on most or all of the merchant websites corresponding to merchants having a high total payment volume or a payment volume over a certain set threshold. Thus, the occurrence of term C on another new website may indicate that the new website may behavior similarly to the websites of current merchant customers of the payment provider and therefore have a similar total payment volume. In further embodiments, a term D may appear on most or all of the websites of current merchant customers of the payment provider that utilize a payment process A for transactions and payment processing. Thus, another new website having term D may indicate that the other new website may similarly wish to use the payment process A as the current merchant customers of the payment provider.

In various embodiments, the payment provider may update the dictionary of terms and their corresponding information (e.g., occurrence, importance, score, associated total payment volume, and/or associated payment processes) based on new information retrievable by the payment provider. For example, the payment provider may scan the current and/or previous merchant customers' websites to determine new terms and/or update terms already in the dictionary. The payment provider may also add new and/or prospective merchant websites into the dictionary, particularly if the prospective merchant becomes a customer of the payment provider (e.g., purchases and/or implements the payment provider's processes). The dictionary may also use historical information for the websites and/or with the payment provider, which may include when merchants became a customer of the payment provider, updates to websites and added/removed content, and other data. The term usage may be country and/or language specific, and may be weighed differently based on the country/language. For example, a term D may be more important or prevalent to English websites in one country over another. However, as processing of the terms depends only on their occurrence, importance, and/or associated total payment volume/payment processes, the dictionary generated using the website data may be independent of word definitions and language semantics, and may also function in any language through processing of term appearance, importance, and/or merchant analytics.

Once the dictionary of terms is determined using the websites of current merchant customers for the payment provider, the payment provider may retrieve website data from prospective merchants. In various embodiments, a merchant may wish to know which payment processes are ideal for the merchant based on the website data for past and current merchants using the payment provider. Thus, the prospective merchant may request that the payment provider scan the website of the prospective merchant. However, in other embodiments, the payment provider may retrieve the information by scanning the Internet for prospective merchant websites based on the presence of words in the dictionary.

Once merchant website data for a prospective merchant is retrieved, the merchant website data may be processed using the dictionary of terms to determine whether any terms appearing on the prospective merchant's website match the terms in the dictionary. For example, the payment provider may perform matching on the terms on the prospective merchant's website (e.g., front webpage and/or sub-webpages constituting the merchant website) to the terms in the dictionary of terms. Thus, the payment provider may perform analytics on the prospective merchant and predict behavior of the merchant based on the appearance of terms on the prospective merchant's website that match the terms in the dictionary. The payment provider may determine whether the merchant may have a high total payment volume based on the appearance of one or more terms associated with merchants having a high total payment volume on the website of the merchant. In other embodiments, the payment provider may determine payment services of the payment provider or other services offered by the payment provider that the prospective merchant may wish to implement in their website based on services used by merchants having matching website terms to the terms on the website of the prospective merchant. The occurrence of terms on the prospective merchant's website may also be scored against the dictionary of terms. For example, the number of appearances, the ratio appearances to other text and terms, the size, the color, the placement, and/or other information for the term may all be used to score how important the term is and how prevalent the term appears on the prospective merchant's website.

In various embodiments, a dedicated application of the prospective merchant may instead be processed against a dictionary of terms for dedicated applications of past and current merchant customers of the payment provider. Thus, the algorithm to determine the dictionary of terms may be different depending on whether the payment provider wishes to create a dictionary for mobile applications, websites, or other electronic merchant portals. In this regard, the algorithm may judge the technology behind the interfaces presented (e.g., the websites, applications, and/or other interfaces), for example, by weighing keywords and other scraped information depending on the type of information. The analytics and weighing for a word or other term may be different for the same term based on whether the term appears on an application interface or a website interface. Thus, the dictionary may be platform specific and rely on terms used within the application or website, or may be platform agnostic and rely instead on term usage. The prospective merchant may be determined based on the dictionary of terms specific to the type of interfaces processed for the prospective merchant.

In various embodiments, the dictionary of terms may also be subdivided to a type of merchant, items sold, size of merchant, or other relevant merchant metric. For example, the dictionary of terms may include groupings of large merchants, merchants who sell a certain type of good (e.g., consumer electronics), local merchants, national/worldwide merchants, service providers, digital goods providers, physical items providers, etc. Using the grouping of the merchant, the dictionary of terms may be specific to sub-types of merchants, and may be used to determine the prospective merchant matching characteristics of the sub-type of merchant. For example, the payment provider may search for prospective merchants matching large merchants, electronic device merchants, etc. The payment provider may then determine the prospective merchant is that specific type of merchant, and may tailor analytics and advertisements to that type of merchant.

Once the prospective merchant is determined, the prospective merchant's total payment volume, and/or services for use by the prospective merchant, the payment provider may determine one or more advertisements or other messages to communicate to the prospective merchant. The message(s) may generally advertise the payment provider's services to the merchant. In other embodiments, the message(s) may include targeted advertisements, which may include information on predictive analysis of the merchant as compared to other merchants having similar website terms. For example, the message(s) may include information on the type of payments the merchant may be expected to receive through the website and/or the type of payment processing required by the merchant based on the similar merchants from the dictionary of terms. Thus, the message(s) may advertise the payment provider's services and other products that may be ideal, best, or most preferable in handling these types of payments or other required services. In other embodiments, the message(s) may include advertisements for payment processes used by the similar merchants determined from the prospective merchant's website terms and the dictionary of terms. In still further embodiments, the message(s) may include behavioral and predictive analytics to the merchant based on the behavior and other analytics of the past and current merchant customers of the payment provider having matching website terms to the website of the prospective merchant. In other embodiments, the payment provider may instead provide a message to a current and/or prospective merchant, where the message alerts the merchant of analytics of terms and term information for similar merchants. The payment provider may choose the information for the similar merchants based on a success rating of the merchant (e.g., total payment volume) or other metric in order to alert the prospective or current merchant of better practices. In various embodiments, the payment provider can suggest to a current customer/merchant that certain words/terms should be changed, moved, etc.

The merchant may respond to the advertisement, such as by declining to purchase the service, enroll in the service, or use the payment provider. Further messages to the prospective merchant and other prospective merchant's may be tailored to the response, for example, by removing advertised material that the prospective merchant responded poorly to or declined. The further messages and advertisements may provide the next best services based on the merchant's total payment volume and/or similar merchants. Where the prospective merchant accepts the offer and utilizes a service of the payment provider, the payment provider may assist the merchant in implementing the service into the merchant's website and/or dedicated application. Moreover, the payment provider may update the dictionary with information for the prospective merchant and the prospective merchant's response, who has now become a current merchant customer to the payment provider.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user, a current merchant server 110, a prospective merchant server 130, and a payment provider server 150 in communication over a network 180. Current merchant server 110 may be established by a merchant customer (not shown) of payment provider server 150 that sets up current merchant server 110 to provide a website (and/or dedicated merchant application) to consumers that may purchase items with the merchant. For example, the website may function as a marketplace or other sales interface for consumers to view items and item information, select items for purchase, enter a checkout process, and pay the merchant. In order to provide payments, current merchant server 110 may utilize one or more processes provided by payment provider server 150. Payment provider server 150 may determine a dictionary of terms appearing on the website of current merchant server 110 and/or other merchant servers, and may associate the terms with other information for the website and/or merchant for current merchant server 110. Using the dictionary, payment provider server 150 may identify prospective merchant server 130 having a website for a prospective merchant customer (not shown). Payment provider server 150 may utilize the dictionary to provide various features and services to prospective merchant server 130.

Current merchant server 110, prospective merchant server 130, and payment provider server 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 180.

Current merchant server 110 may be implemented using any appropriate hardware and software configured for wired and/or wireless communication with communication device 130 and/or payment provider server 150. Current merchant server 110 may correspond to a device, server, or cloud computing architecture to provide sales of items, for example, through a physical merchant location and/or an online marketplace accessible over a network connection that has a corresponding physical location for retrieval of one or more sold items. Current merchant server 110 may further be used to process payments for items, provide incentives for purchase of items, advertise items, and/or allow release of items to current merchant server 110. Although a merchant device is shown, the merchant device may be managed or controlled by any suitable processing device. Although only one merchant device is shown, a plurality of merchant devices may function similarly.

Current merchant server 110 of FIG. 1 contains a website application 120, a sales application 112, other applications 114, a database 116, and a communication module 118. Website application 120, sales application 112, and other applications 114 may correspond to processes, procedures, and/or applications executable by a hardware processor, for example, a software program. In other embodiments, current merchant server 110 may include additional or different modules having specialized hardware and/or software as required.

Website application 120 may correspond to one or more processes to execute modules and associated specialized hardware of current merchant server 110 to provide a website for a merchant, which may include one or more webpages accessible over a network by a consumer in order to shop with the merchant. In this regard, website application 120 may correspond to specialized hardware and/or software of current merchant server 110 that provide a website and corresponding interfaces. The website may correspond to a merchant marketplace for the current merchant associated with current merchant server 110, or other sales interface. Website application 120 may provide the website over a network, for example, accessible using a browser over the Internet. A consumer may visit the website hosted by website application 120 to view one or more items for purchase. Moreover, the website may allow the user to select one or more of the item(s) for purchase and enter the selected item(s) to a transaction. The website may include checkout and payment processes for use in completing the transaction between the user and the merchant. The website may provide shopping, checkout, and/or payment services through payment provider server 150 and/or using services offered by payment provider server 150, for example, using sales application 112. Moreover, shopping and transaction information generated by website application 120 and using services, processes, and features provided by payment provider server 150 may be collected by payment provider server 150 to determine a total payment volume and/or other analytical information on merchant behavior (e.g., sales, payment processes used, user integration and/or satisfaction, etc.). In other embodiments, website application 120 may instead correspond to a dedicated application provided by current merchant server 110, which may provide data used by the application (e.g., retrievable through an API call of the dedicated application to website application 120).

The website provided by website application 120 may further include associated website data. The website data may be displayed on or otherwise retrievable from the website (e.g., through accessing stored database information associated with the website). The website data may correspond to information provided by the merchant on the website, such as titles, descriptions, instructions, categories, merchant information, and/or other shopping/payment information. The website data may also include information entered by consumers to or using the website. For example, the website data may include forum posts, user reviews, messages, user information, and/or other user entered data. The website data may include text, as well as text metadata (e.g., color, placement, size, font, etc.). In further embodiments, the website data may also include images, banners, logos, symbols, and other graphical elements. The website data may be retrieved by payment provider server 150, as discussed herein.

Sales application 112 may correspond to one or more processes to execute modules and associated specialized hardware of current merchant server 110 to sell one or more items offered by a current merchant customer (not shown) of payment provider server 150 and associated with current merchant server 110 through a website provided by website application 120. Sales application 112 may further provide checkout and payment processes for a transaction to purchase the items for sale from the merchant corresponding to current merchant server 110. In this regard, sales application 112 may correspond to specialized hardware and/or software of current merchant server 110 to provide shopping, checkout, and payment processes used in the website. For example, sales application 112 may provide item sales through an online marketplace using the website of the merchant. In other embodiments, sales application 112 may provide sale of items in a physical location, such as a physical merchant retail location, through the website of the merchant.

Sales application 112 may include information for a price for the item, a discount for the item, a price change for the item, and/or other incentives for items and/or with the merchant corresponding to current merchant server 110 (e.g., rebates, payments, etc.). Additionally, the sales data and other item data (e.g., inventory, status, condition, etc.) in the purchase information may be retrievable by the website of current merchant server 110, such as request-able through an API call and/or retrievable from database 116. The information may be based updated periodically or continuously, such as in real time and information for the item(s) for sale changes. Sales application 112 may be used to establish a transaction once a consumer has selected one or more items for purchase in a transaction, which may utilize checkout processes provided by payment provider server 150. Once a payment amount is determined for the transaction for the item(s) to be purchased, sales application 112 may request payment from the consumer using processes provided by payment provider server 150. Sales application 112 may receive payment processing information, such as a purchase request. In such embodiments, the purchase request may be processed, payment provided to the merchant account, and notification of payment (or failure, for example, where there are insufficient user funds) may be sent to sales application 112. The payment may be made by payment provider server 150 on behalf of the user associated with current merchant server 110. Sales application 112 may then receive the results of the transaction processing, and complete the transaction with the user, for example, by providing the user the items for the transaction or declining the transaction where the user is not authenticated or the transaction is not authorized (e.g., insufficient funds).

Current merchant server 110 includes other applications 114 as may be desired in particular embodiments to provide features to current merchant server 110. For example, other applications 114 may include security applications for implementing server-side security features, programmatic client applications for interfacing with appropriate application programming interfaces (APIs) over network 180, or other types of applications. Other applications 114 may also include email, texting, voice and IM applications that allow a merchant to send and receive emails, calls, texts, and other notifications through network 180. In various embodiments, other applications 114 may include financial applications, such as banking, online payments, money transfer, or other applications associated with payment provider server 150. Other applications 114 may contain software programs, executable by a processor, including a graphical user interface (GUI) for a website or application configured to provide an interface to consumers.

Current merchant server 110 may further include database 116 which may include, for example, identifiers such as operating system registry entries, identifiers associated with hardware of current merchant server 110, or other appropriate identifiers, such as identifiers used for payment/merchant/server authentication or identification. Identifiers in database 116 may be used by a payment/credit provider, such as payment provider server 150, to associate current merchant server 110 with a particular account maintained by the payment/credit provider. Item, sales, and/or benefit information for items sold by the merchant associated with current merchant server 110 may be stored to database 116. Database 116 may further include website data and information, including term information for terms used on or with a website for current merchant server 110.

Current merchant server 110 includes at least one communication module 118 adapted to communicate with payment provider server 150. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Prospective merchant server 130 may be implemented using any appropriate hardware and software configured for wired and/or wireless communication with communication device 130 and/or payment provider server 150. Prospective merchant server 130 may correspond to a device, server, or cloud computing architecture to provide sales of items, for example, through a physical merchant location and/or an online marketplace accessible over a network connection that has a corresponding physical location for retrieval of one or more sold items. Prospective merchant server 130 may further be used to process payments for items, provide incentives for purchase of items, advertise items, and/or allow release of items to current merchant server 110. Although a merchant device is shown, the merchant device may be managed or controlled by any suitable processing device. Although only one merchant device is shown, a plurality of merchant devices may function similarly.

Prospective merchant server 130 of FIG. 1 contains a website application 140, a sales application 132, other applications 134, a database 136, and a communication module 138. Website application 140, sales application 132 and other applications 134 may correspond to processes, procedures, and/or applications executable by a hardware processor, for example, a software program. In other embodiments, prospective merchant server 130 may include additional or different modules having specialized hardware and/or software as required.

Website application 140 may correspond to one or more processes to execute modules and associated specialized hardware of prospective merchant server 130 to provide a website for a merchant, which may include one or more webpages accessible over a network by a consumer in order to shop with the merchant. In this regard, website application 140 may correspond to specialized hardware and/or software of prospective merchant server 130 that provide a website and corresponding interfaces. The website may correspond to a merchant marketplace for a prospective merchant associated with prospective merchant server 130, or other sales interface. Website application 140 may provide the website over a network, for example, accessible using a browser over the Internet. A consumer may visit the website hosted by website application 140 to view one or more items for purchase. Moreover, the website may allow the user to select one or more of the item(s) for purchase and enter the selected item(s) to a transaction. The website may include checkout and payment processes for use in completing the transaction between the user and the merchant. In various embodiments, the website may correspond to a prospective merchant that does not implement any services or features associated with payment provider server 150. However, the website may also provide shopping, checkout, and/or payment services through payment provider server 150 and/or using services offered by payment provider server 150. In this regard, payment provider server 150 may further process the website and associated website term data to determine additional services and analytics to offer the prospective merchant for use in the website. Moreover, shopping and transaction information generated by website application 140 may be collected by payment provider server 150 to determine a total payment volume and/or other analytical information on merchant behavior (e.g., sales, payment processes used, user integration and/or satisfaction, etc.) of the prospective merchant. In other embodiments, website application 140 may instead correspond to a dedicated application provided by prospective merchant server 130, which may provide data used by the application (e.g., retrievable through an API call of the dedicated application to website application 140).

The website provided by website application 140 may further include associated website data. The website data may be displayed on or otherwise retrievable from the website (e.g., through accessing stored database information associated with the website). The website data may correspond to information provided by the merchant on the website, such as titles, descriptions, instructions, categories, merchant information, and/or other shopping/payment information. The website data may also include information entered by consumers to or using the website. For example, the website data may include forum posts, user reviews, messages, user information, and/or other user entered data. The website data may include text, as well as text metadata (e.g., color, placement, size, font, etc.). In further embodiments, the website data may also include images, banners, logos, symbols, and other graphical elements. The website data may be retrieved by payment provider server 150, as discussed herein.

Sales application 112 may correspond to one or more processes to execute modules and associated specialized hardware of prospective merchant server 130 to sell one or more items offered by a prospective merchant customer (not shown) of payment provider server 150 and associated with prospective merchant server 130 through a website provided by website application 140. Sales application 112 may further provide checkout and payment processes for a transaction to purchase the items for sale from the merchant corresponding to prospective merchant server 130. In this regard, sales application 112 may correspond to specialized hardware and/or software of prospective merchant server 130 to provide shopping, checkout, and payment processes used in the website. For example, sales application 112 may provide item sales through an online marketplace using the website of the merchant. In other embodiments, sales application 112 may provide sale of items in a physical location, such as a physical merchant retail location, through the website of the merchant.

Sales application 112 may include information for a price for the item, a discount for the item, a price change for the item, and/or other incentives for items and/or with the merchant corresponding to prospective merchant server 130 (e.g., rebates, payments, etc.). Additionally, the sales data and other item data (e.g., inventory, status, condition, etc.) in the purchase information may be retrievable by the website of prospective merchant server 130, such as request-able through an API call and/or retrievable from database 116. The information may be based updated periodically or continuously, such as in real time and information for the item(s) for sale changes. Sales application 112 may be used to establish a transaction once a consumer has selected one or more items for purchase in a transaction. Once a payment amount is determined for the transaction for the item(s) to be purchased, sales application 112 may request payment from the consumer. Sales application 112 may receive payment processing information, such as a purchase request. In such embodiments, the purchase request may be processed, payment provided to the merchant account, and notification of payment (or failure, for example, where there are insufficient user funds) may be sent to sales application 112. Sales application 112 may then receive the results of the transaction processing, and complete the transaction with the user, for example, by providing the user the items for the transaction or declining the transaction where the user is not authenticated or the transaction is not authorized (e.g., insufficient funds). In various embodiments, some or all of the aforementioned features may be provided by payment provider server 150 or may be processed using other processes. In this regard, payment provider server 150 may attempt to advertise additional services and features to the prospective merchant corresponding to prospective merchant server 130.

Prospective merchant server 130 includes other applications 134 as may be desired in particular embodiments to provide features to prospective merchant server 130. For example, other applications 134 may include security applications for implementing server-side security features, programmatic client applications for interfacing with appropriate application programming interfaces (APIs) over network 180, or other types of applications. Other applications 134 may also include email, texting, voice and IM applications that allow a merchant to send and receive emails, calls, texts, and other notifications through network 180. In various embodiments, other applications 134 may include financial applications, such as banking, online payments, money transfer, or other applications associated with payment provider server 150. Other applications 134 may contain software programs, executable by a processor, including a graphical user interface (GUI) configured to provide an interface of a website or application to consumers.

Prospective merchant server 130 may further include database 136 which may include, for example, identifiers such as operating system registry entries, identifiers associated with hardware of prospective merchant server 130, or other appropriate identifiers, such as identifiers used for payment/user/device authentication or identification. Identifiers in database 136 may be used by a payment/credit provider, such as payment provider server 150, to associate prospective merchant server 130 with a particular account maintained by the payment/credit provider. Item, sales, and/or benefit information for items sold by the merchant associated with prospective merchant server 130 may be stored to database 136. Database 136 may further include website information and other data, such as website term data for terms used on or with a website.

Prospective merchant server 130 includes at least one communication module 138 adapted to communicate with payment provider server 150. In various embodiments, communication module 138 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Payment provider server 150 may be maintained, for example, by an online service provider, which may provide connection services on behalf of users. In this regard, payment provider server 150 includes one or more processing applications which may be configured to interact with communication device 130, prospective merchant server 130, and/or another device/server to facilitate payments and payment processing. In one example, payment provider server 150 may be provided by PAYPAL®, Inc. of San Jose, Calif., USA. However, in other embodiments, payment provider server 150 may be maintained by or include another type of service provider, which may provide connection services to a plurality of users.

Payment provider server 150 of FIG. 1 includes a website processing application 160, a merchant advertisement application 170, a transaction processing application 152, other applications 154, a database 156, and a network interface component 158. User connection application 170, transaction processing application 152, and other applications 154 may correspond to executable processes, procedures, and/or applications with associated hardware. In other embodiments, payment provider server 150 may include additional or different modules having specialized hardware and/or software as required.

Website processing application 160 may correspond to one or more processes to execute software modules and associated specialized hardware of payment provider server 150 to retrieve website data for a prospective merchant customer of payment provider server 150 and process the website data using website term information stored to database 156. In this regard, website processing application 160 may correspond to specialized hardware and/or software to determine that prospective merchant server 130 corresponds to a prospective merchant customer of payment provider server 150 that may wish to implement one or more processes, services, and/or features of payment provider server 150 into a website of the prospective merchant. For example, website processing application 160 may receive a request to process the website data for the website of prospective merchant server 130. In other embodiments, website processing application 160 may instead comb or scrape available webpages and/or perform webpage searches using terms from the website term information to determine the webpage for prospective merchant website 130 is a website of a prospective merchant.

Prior to determination of the website of prospective merchant server 130 is a website for a prospective merchant customer, website processing application 160 may determine the website term information for past and/or current merchant customers of payment provider server 150. The website term information may include processed website data having texts, graphics, and/or images (e.g., terms) used on the past and/or current merchant customers of payment provider server 150 that utilize one or more service of payment provider server 150. Thus, the website data may correspond to a website of the merchant having text, images, and other data represented on the website of the merchant. In further embodiments, a dedicated application having one or more application interfaces may also be used. Website processing application 160 may scan the websites (and/or dedicated applications) of the past and/or current merchant customers (e.g., the website hosted by website application 120 of current merchant server 110) or pull the website data from a database (e.g., database 116 of current merchant server 110). Once pulled, website processing application 160 may parse the data to determine text and other terms included on the merchant websites (and/or dedicated applications). The terms may include terms used by the merchant on their website (e.g., information displayed on a front webpage and/or sub-webpages, sales, payment, checkout, merchant, and/or consumer information). The terms may also include information provided by consumers on the website, including product reviews, forum postings, messages, service requests, and other types of information submitted by users to the website. The terms may correspond to a single text element, such as a character or word, as well as multiple text elements (e.g., a sentence). The terms may also include information on usage, such as nearby terms and/or accompanying terms, placement in a sentence or paragraph, or other term information. In various embodiments, the terms may further include visual images appearing on the merchant website, as well as logos and other graphics. Such images may be processed using image processing techniques to determine the content of the image, or may be matched to pre-existing images, such as similar logos, banners, and graphics used by merchants, payment providers, customer users, and/or service providers.

Thus, website processing application 160 may determine the website term information having a dictionary of terms used on webpages of existing and/or past merchant customers of payment provider server 150 (e.g., merchants that utilize services, processes, and/or features provided by payment provider server 150). The dictionary may include one or more terms, as well as analytics for each term, such as rankings or numbers of how often terms appear on the websites, on what percentage of the websites that the terms appear, where they appear on the websites, and/or other analytic associated with the appearance of the terms on the websites. In this regard, the terms may provide an indication of the terms importance or prevalence of appearance on the merchant websites. For example, a term appearing on a high number/percentage of websites and/or having a large number of appearances may be indicated as important to determining similar merchants that may wish to use services provided by payment provider server 150. Conversely, a term appearing only a few times and/or on a low percentage of the websites may not be indicative of a potential merchant customer of the payment provider. Thus, the number of times the term appears on a single website and across a plurality of merchants' websites may be important. In other embodiments, other data for the term may also be used to score or rank the term, or may provide other indications of how well the term performs in predicting behavior of other prospective merchant clients based on their website data. For example, the placement of a term on the website may be important (e.g., on the front webpage of a website or a sub-page of the website), a size or font of the term (e.g., terms with large size or prominent fonts so as to be visible), a color of the term, and/or a ratio of the term to other terms and elements on the website (e.g., if the term appears in a high ratio or where the term may appear in a low ratio due to a high volume of text and other terms presented on the website).

Website processing application 160 may further determine a total payment volume by the merchant, which may correspond to a number, amount, and/or frequency of payments to the merchant by the merchant's consumer base. The total payment volume may indicate the merchant's performance and well as the payment services of payment provider server 150 that would be ideal for the merchant. Website processing application 160 may also determine the payment processing features and services that each merchant uses. The aforementioned data may be paired with the website term information to associate total payment volumes and/or payment processes with various website terms.

In various embodiments, website processing application 160 may update the dictionary of terms and their corresponding information (e.g., occurrence, importance, score, associated total payment volume, and/or associated payment processes) based on new information retrievable from each merchant website. Website processing application 160 may also add new and/or prospective merchant websites into the dictionary, particularly if the prospective merchant becomes a customer of the payment provider (e.g., purchases and/or implements the payment provider's processes). The dictionary may also use historical information for the websites and/or with the payment provider, which may include when merchants became a customer of the payment provider, updates to websites and added/removed content, and other data. The term usage may be country and/or language specific, and may be weighed differently based on the country/language.

Website processing application 160 may pull or retrieve the website data for the website, for example, from a database associated with the website (e.g., database 136 of prospective merchant server 130). In other embodiment, website processing application 160 may instead scrape the data from displayed or retrievable data on the website, for example, from one or more webpages constituting the website (e.g., the website hosted by website application 140 of prospective merchant server 130). Once determined, website processing application 160 may process the website data for prospective merchant server 130 using the website term information to determine services and/or analytics to offer to prospective merchant server 130. For example, based on one or more matching terms, website processing application 160 may determine whether prospective merchant server 130 would be a candidate to utilize one or more services of payment provider server 150, as well as what services prospective merchant server 130 may wish to utilize. Website processing application 160 may also determine a predicted total payment volume based on the appearance of one or more terms and their associated merchants. In various embodiments, a score may also be determined for the website, which may correspond to number of appearance, number of terms, strength of each term, and/or the merchants matching the terms total payment volume and/or used payment services. Other statistics, such as the number of appearances, the ratio appearances to other text and terms, the size, the color, the placement, and/or other information for the term may all be used in the score. In various embodiments, a dedicated application of prospective merchant server 130 may instead be processed against a dictionary of terms for dedicated applications of past and current merchant customers of payment provider server 150. Thus, the dictionary may be platform specific and rely on terms used within the application or website, or may be platform agnostic and rely instead on term usage.

Merchant advertisement application 170 may correspond to one or more processes to execute software modules and associated specialized hardware of payment provider server 150 to generate advertisements and/or message to prospective merchants determined using website processing application 160 of services and analytics, and communicate the messages to the prospective merchants. In this regard, merchant advertisement application 170 may correspond to specialized hardware and/or software to access prospective merchant information determined using website processing application 160. The prospective merchant information may include prospective merchants (e.g., the merchant corresponding to prospective merchant server 130) as well as the total payment volume, potential payment services, and/or other information for the merchant. Merchant advertisement application 170 may generate an advertisement for to prospective merchant server 130 based on the prospective merchant information determined using the merchant's website data and the website term information. The advertisement may generally advertise the services of payment provider server 150 to prospective merchant server 130. In other embodiments, the advertisement may be targeted to the services determined to be useful to prospective merchant server 130. Moreover, the advertisements may also include messages of analytics or other data for the prospective merchant using the website term information.

Transaction processing application 152 may correspond to one or more processes to execute software modules and associated specialized hardware of payment provider server 150 to provide payment services to merchant and users, for example though a user's payment account and/or payment instruments. In this regard, transaction processing application 152 may correspond to specialized hardware and/or software to provide payment services, which may be implemented into one or more merchant websites and/or dedicated applications of a merchant. The payment services may allow for a payment to the merchant by a user through a payment instrument, including a credit/debit card, banking account, payment account with payment provider server 150, and/or other financial instrument. In order to establish a payment account for a merchant and/or user to send and receive payments, transaction processing application 152 may receive information requesting establishment of the payment account. The information may include user personal and/or financial information. Additionally the information may include a login, account name, password, PIN, or other account creation information. The merchant/user may provide a name, address, social security number, or other personal information necessary to establish the account and/or effectuate payments through the account. Transaction processing application 152 may further allow the merchant/user to service and maintain the payment account, for example, by adding and removing payment instruments. Transaction processing application 152 may be used to provide a payment for an item to a merchant, such as current merchant server 110 and/or prospective merchant server 130. Transaction processing application 152 may debit an account of the user automatically and provide the payment to an account of the merchant. Transaction processing application 152 may also be used to provide transaction histories for processed transactions.

In various embodiments, payment provider server 150 includes other applications 154 as may be desired in particular embodiments to provide features to payment provider server 134. For example, other applications 154 may include security applications for implementing server-side security features, programmatic client applications for interfacing with appropriate application programming interfaces (APIs) over network 180, or other types of applications. Other applications 154 may contain software programs, executable by a processor, including a graphical user interface (GUI), configured to provide an interface to the user when accessing payment provider server 150, where the user or other users may interact with the GUI to more easily view and communicate information. In various embodiments, other applications 154 may include connection and/or communication applications, which may be utilized to communicate information to over network 180.

Additionally, payment provider server 150 includes database 156. As previously discussed, the user and/or the merchant corresponding to telecommunication carrier server 170 may establish one or more digital wallets and/or payment accounts with payment provider server 150. Digital wallets and/or payment accounts in database 156 may include user information, such as name, address, birthdate, payment instruments/funding sources, additional user financial information, user preferences, and/or other desired user data. Users may link to their respective digital wallets and/or payment accounts through an account, user, merchant, and/or device identifier. Thus, when an identifier is transmitted to payment provider server 150, e.g. from communication device 130, one or more digital wallets and/or payment accounts belonging to the users may be found. Additionally, database 156 may store data for various websites, as well as process website term information and information on prospective merchant customers for payment provider server 150.

In various embodiments, payment provider server 150 includes at least one network interface component 158 adapted to communicate current merchant server 110 and/or prospective merchant server 130 over network 180. In various embodiments, network interface component 158 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 180 may be implemented as a single network or a combination of multiple networks. For example, in various embodiments, network 180 may include the Internet or one or more intranets, landline networks, wireless networks, and/or other appropriate types of networks. Thus, network 180 may correspond to small scale communication networks, such as a private or local area network, or a larger scale network, such as a wide area network or the Internet, accessible by the various components of system 100.

Figure 2:
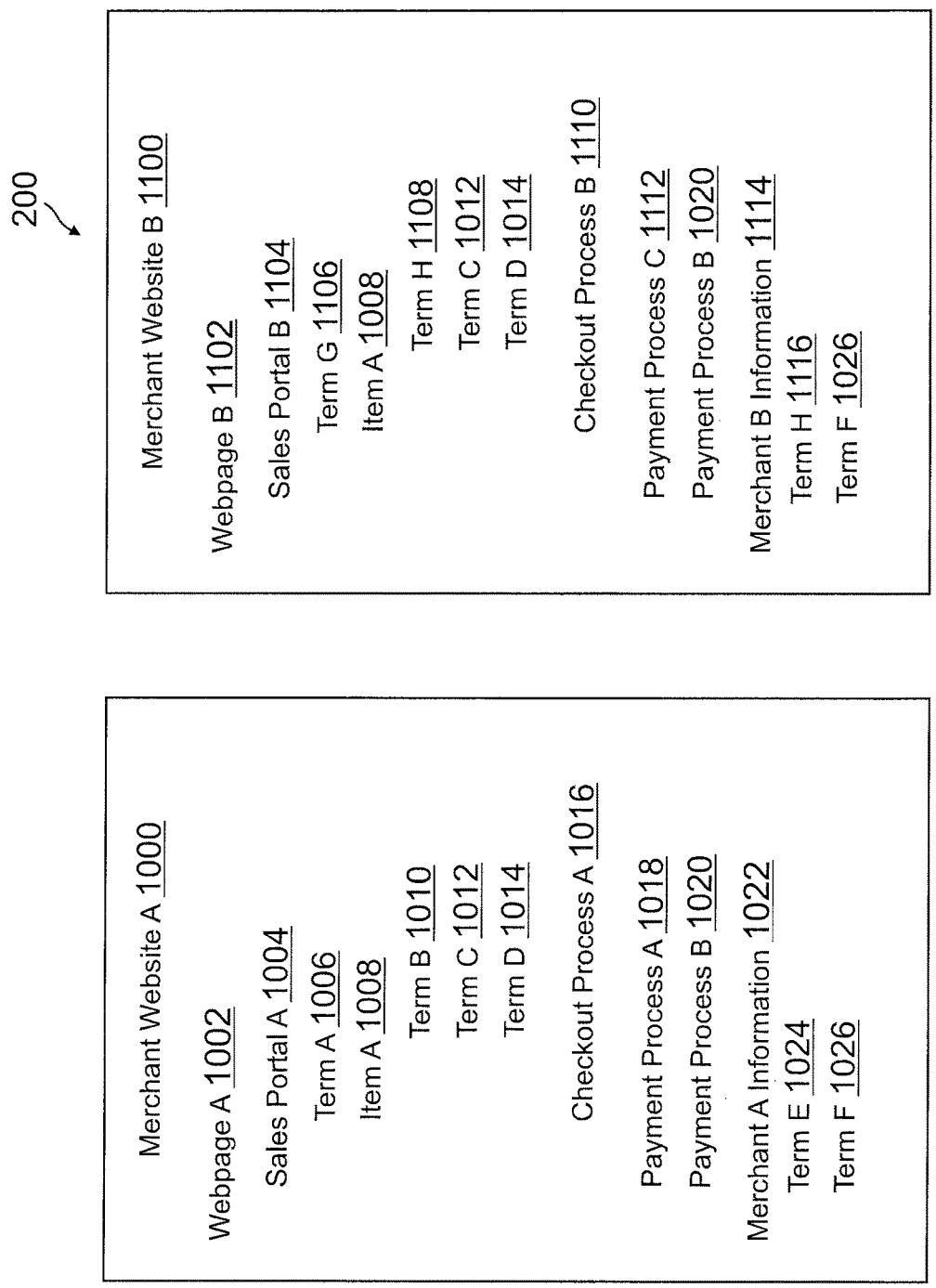
FIG. 2 is a representation of two exemplary merchant website interfaces for use in determining a dictionary of website terms and providing targeted advertisement of payment services, according to an embodiment.

FIG. 2 is a representation of two exemplary merchant website interfaces for use in determining a dictionary of website terms and providing targeted advertisement of payment services, according to an embodiment. Environment 200 includes a merchant website A 1000 corresponding to a current merchant customer website provided by website application 120 executed by current merchant server 110 in environment 100 of FIG. 1. Moreover, environment 200 includes a merchant website B 1100 corresponding to a prospective merchant customer website provided by website application 140 executed by prospective merchant server 130 in environment 100 of FIG. 1.

Merchant website A 1000 may correspond to a website of a current merchant customer of a payment provider that utilizes various shopping, checkout, and/or payment services and features provided by the payment provider. In this regard, merchant website A 1000 includes a webpage A 1002 having data that may include terms used on merchant website A 1000. For example, webpage A 1002 includes a sales portal A 1004 for sales of items. Sales portal A 1004 may include a term A 1006, such as text, logos, banners, images, and/or graphics. Term A 1006 may be included in the website data for merchant website A 1000 as a term used on merchant website A 1000. Sales portal A 1004 may also include an item A 1008 having a term B 1010, a term C 1012, and a term D 1014. Sales portal A 1004 may also include a checkout process A 1016.

Webpage A 1002 may further include payment processes for use with sales portal A 1004. For example, a customer of merchant website A 1000 may utilize payment process A 1018 and/or payment process B 1020. Payment process A 1018 and payment process B 1020 may correspond to payment processes offered by the payment provider. Moreover, in certain embodiments, processes and features of sales portal A 1004 and/or checkout process A 1016 may also be offered by the payment provider. The payment provider may further process data from merchant A information 1022, such as term E 1024 and term F 1026 in various embodiments.

Merchant website B 1100 may correspond to a website of a prospective merchant, which may be a candidate to utilize one or more of the processes or services provided by the payment provider. Thus, the payment provider may process data available from webpage B 1102. For example, webpage B 1102 may include information for sales portal B 1104. Thus, the payment provider may determine that webpage B includes term G 1106, as well as the terms for item A 1008 (e.g., term H 1108, term C 1012, and term D 1014). As term C 1012 and term D 1014 match between webpage A 1002 of the current merchant customer of the payment provider and webpage B 1102 of the prospective merchant customer of the payment provider, the payment provider may determine that merchant website B 1100 may be a prospective customer, may wish to utilize one or more processes or services utilized by merchant website A 1000, and/or may provide analytics on similar current merchant customers. For example, although webpage B 1102 uses checkout process B 1110, webpage B 1102 may better utilize checkout process A 1016. Similarly, although payment process C 1112 is used on webpage B 1102, payment process A 1018 of webpage A 1002 may be better or ideal.

In similar fashion, additional matching information may also be used to provide similarities between merchant website A 1000 and merchant website B 1100. For example, payment process B 1020 is shared between webpage A 1002 and webpage B 1102. In addition, merchant B information 1114 for merchant website B 1100 has a new term H 1116, but shares term F 1026 with merchant A information 1022 for merchant website A 1000. Thus, additional information and terms may be shared between websites.

Figure 3:
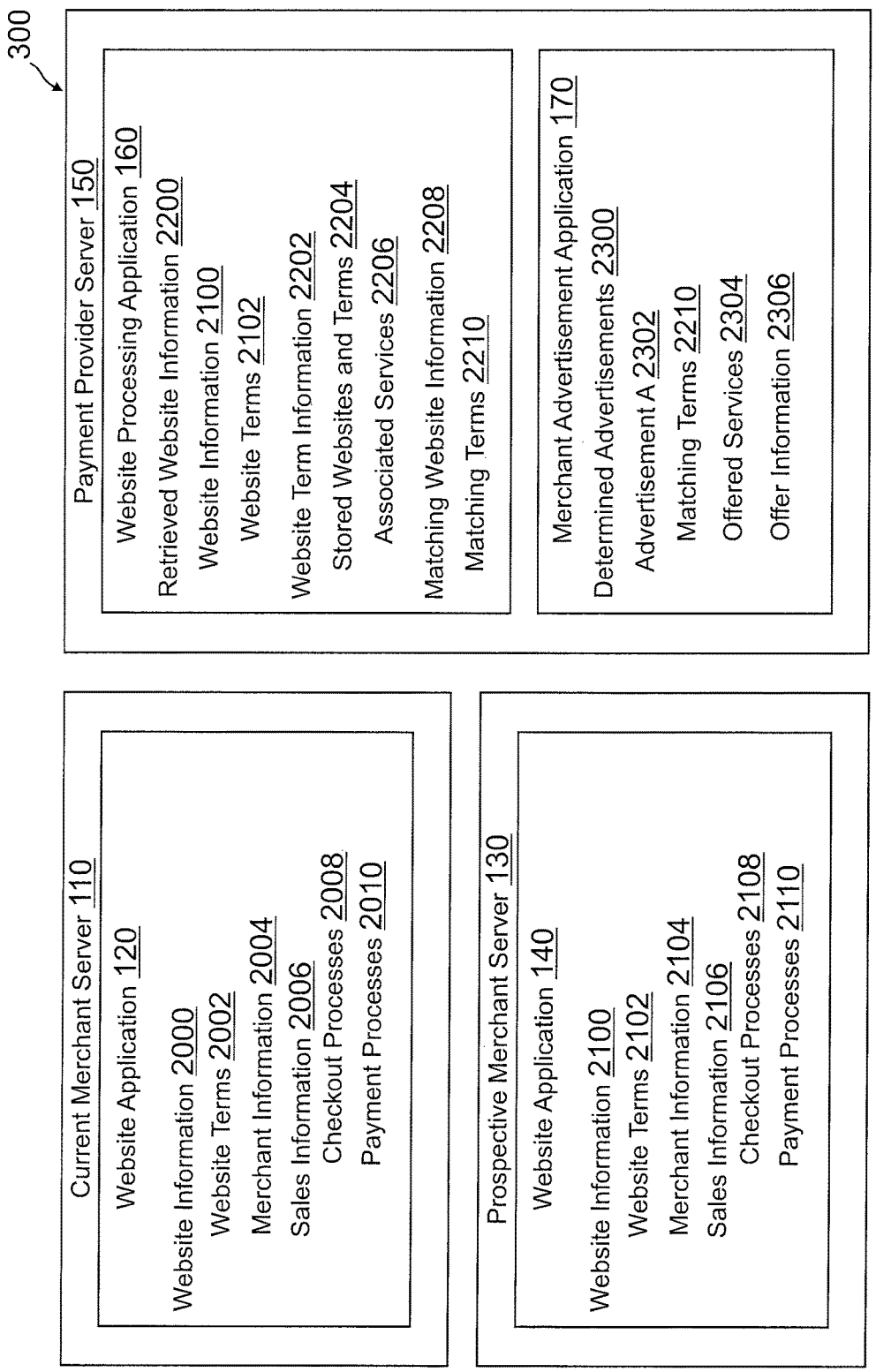
FIG. 3 is an exemplary system environment having merchant website servers with data necessary for determining a dictionary of website terms and providing targeted advertisement of payment services, according to an embodiment.

FIG. 3 is an exemplary system environment 300 having merchant website servers with data necessary for determining a dictionary of website terms and providing targeted advertisement of payment services, according to an embodiment. FIG. 3 includes current merchant server 110, a prospective merchant server 130, and a payment provider server 150 all discussed in reference to environment 100 of FIG. 1.

Current merchant server 110 executes website application 120 corresponding generally to the specialized hardware and/or software modules and processes described in reference to FIG. 1. In this regard, website application 120 includes information for a website hosted by a current merchant customer of payment provider server 150. For example, website information 2000 may be utilized with the website. Website information 2000 may include data that may be extracted or determined by payment provider server 150. Thus, website information 2000 includes website terms 2002. Website information 2000 may also include merchant information 2004 and sales information 2006, such as checkout processes 2008 and payment processes 2010.

Similarly, prospective merchant server 130 executes website application 140 corresponding generally to the specialized hardware and/or software modules and processes described in reference to FIG. 1. In this regard, website application 140 includes information for a website hosted by a prospective merchant customer of payment provider server 150. Website information 2100 may be processed by payment provider server 150 to provide services and analytics to the prospective merchant customer. Website information similarly includes website terms 2102 used to match to website terms 2002 of current merchant server 110. Additionally, merchant information 2104 and sales information 2106 having checkout processes 2108 and payment processes 2110 may be matched to merchant information 2004 and sales information 2006 of current merchant server 110. In various embodiments, payment provider server 150 may offer changes and upgrades to sales information 2106, such as new checkout and/or payment processes.

Payment provider server executes website processing application 160 and merchant advertisement application 170 corresponding generally to the specialized hardware and/or software modules and processes described in reference to FIG. 1. In this regard, website processing application 160 may process website information 2000 and website information 2100. For example, website information 2100 may be included in retrieved website information 2200, which may also include website terms 2102 for website information 2100. Website term information 2202 includes information processes from a plurality of current merchant customer of payment provider server 150, such on the websites of the current merchant customers. Thus, website term information 2202 includes website information 2000 in stored websites and terms 2204. Stored websites and terms 2204 further includes associated services 2206 for the services provided by the websites in stores websites and terms 2204. Using the aforementioned information, website processing application 160 may determine matching website information 2208, which may include matching terms 2210.

Merchant advertisement application 170 may be used to provide advertisements and/or messages based on matching website information 2208. For example, merchant advertisement application 170 includes determined advertisements 2300, such as advertisement A 2302. Advertisement A 2302 may include matching terms 2210. Moreover, advertisement A 2302 includes information offered to a prospective merchant, such as offered services 2304 and/or offered information 2306 (e.g., merchant analytics).

Figure 4:
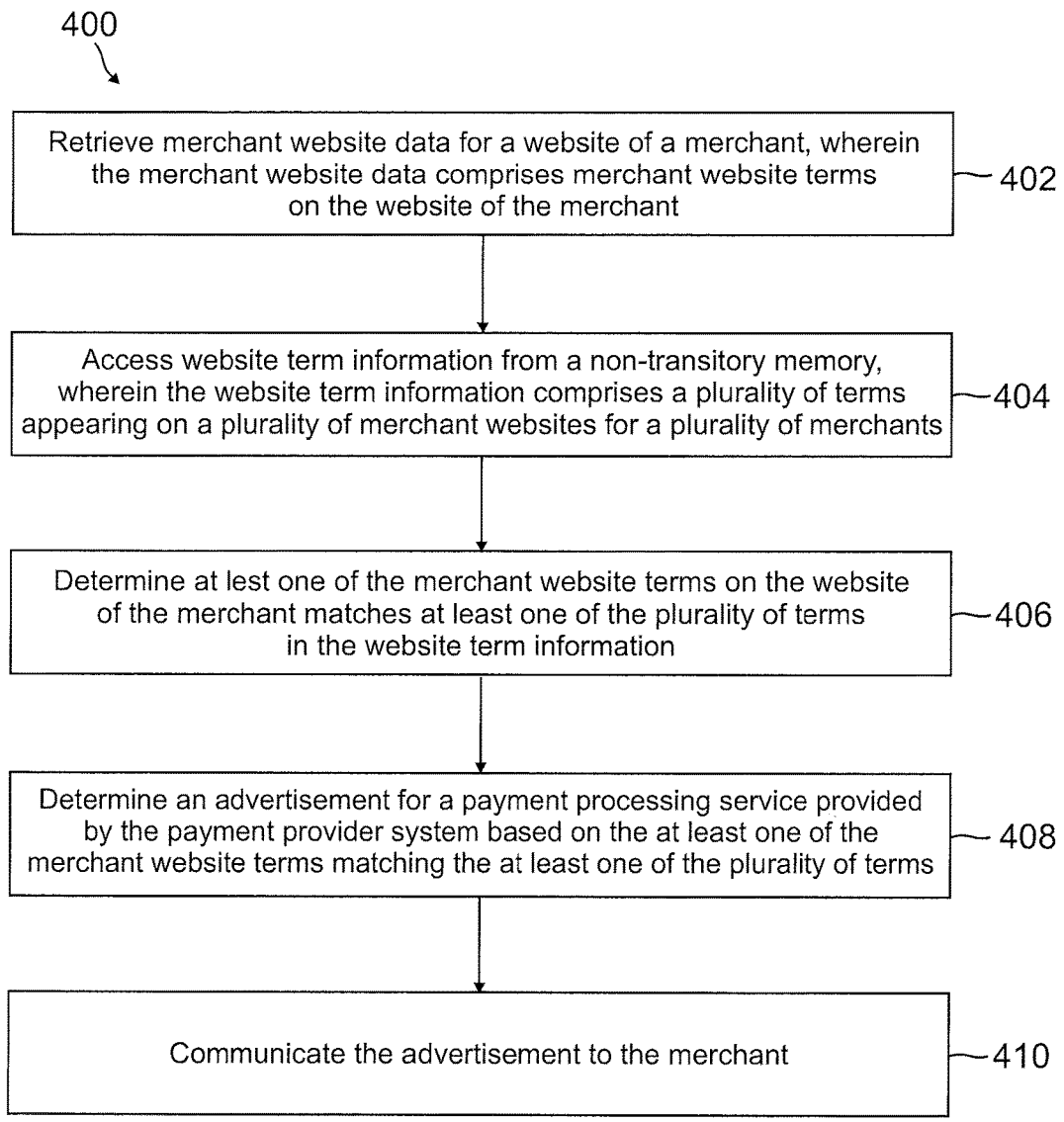
FIG. 4 is a flowchart of an exemplary process for predicting merchant behavior using merchant website terms, according to an embodiment.

FIG. 4 is a flowchart 400 of an exemplary process for predicting merchant behavior using merchant website terms, according to an embodiment. Note that one or more steps, processes, and methods described herein may be omitted, performed in a different sequence, or combined as desired or appropriate.

At step 402, merchant website data for a website of a merchant is retrieved, by a payment provider system that comprises one or more hardware processors coupled to a non-transitory memory, merchant website data for a website of a merchant, wherein the merchant website data comprises merchant website terms on the website of the merchant. The merchant website data may be for a plurality of merchant webpages constituting the website of the merchant. The merchant website data may comprise text used by the merchant on the plurality of merchant webpages. The merchant website data may also include text on the plurality of merchant webpages by at least one customer of the merchant in a forum, website postings, messages, and requests on the plurality of merchant webpages. The merchant website data may further comprise a text size, a color, a font, a sequence of terms, a ratio of a term to other terms, and a type of merchant for the merchant. The website of the merchant may be one of a mobile website type, a dedicated application website type, and a traditional website type, wherein the website term information is particular to one of the mobile website type, the dedicated application website type, and the traditional website type.

Website term information is accessed, from the non-transitory memory, wherein the website term information comprises a plurality of terms appearing on a plurality of merchant websites for a plurality of merchants, at step 404. For example, the plurality of merchants may comprise previous customers and current customers of the payment provider system utilizing at least one service provided by the payment provider system. Thus, the merchant may comprise a prospective customer of the payment provider system. In various embodiments, the website term information is determined using the plurality of merchant websites for the plurality of merchants, wherein the website term information is determined based on occurrences of the plurality of terms on the plurality of merchant websites and current payment processing services utilized by each of the plurality of merchants.

Moreover, each of the plurality of terms in the website term information may further be associated with a weighted score based on an importance for the each of the plurality of terms being found on the merchant website when determining the advertisement. For example, the weighted score for the each of the plurality of terms may be determined based on payment processing services used by the plurality of merchants and the plurality of terms occurring on each of the plurality of merchant websites. At least one of the merchant website terms on the website of the merchant is determined to match at least one of the plurality of terms in the website term information, at step 406. For example, the merchant may be linked to at least one of the plurality of merchants based on the merchant website terms and the plurality of terms.

At step 408, an advertisement for a payment processing service provided by the payment provider system is determined based on the at least one of the merchant website terms matching the at least one of the plurality of terms. In various embodiments, the merchant website data includes a number of occurrences for each of the merchant website terms on the website of the merchant, wherein the advertisement is further determined based on the number of occurrences. In further embodiments, a total score for the website of the merchant may be determined using the score associated with each of the plurality of terms, wherein at least one of the advertisement and the payment processing service is further determined using the total score. For example, the total score may be used to determine a prediction comprising at least one of a merchant size, payment sizes for payments to the merchant, payment volume for the payments to the merchant, and a customer type. Thus, at least one of the advertisement and the payment processing service is determined using the prediction.

The advertisement is communicated to the merchant, at step 410. The payment processing service in the advertisement may comprise a payment process for merchant customers to provide payments to the merchant, a website payment flow for the website of the merchant, a payment account service with the payment provider system, and a checkout process on the website of the merchant. The payment processing service may be implemented in the website of the merchant if the merchant accepts the advertisement. In various embodiments, the process may further include updating the website term information with the merchant website terms if the merchant accepts the payment processing service, wherein the merchant website terms are associated with the payment processing service. Thus, at least one new merchant website to retrieve additional merchant website data from may be determined based on the updated website term information.

Figure 5:
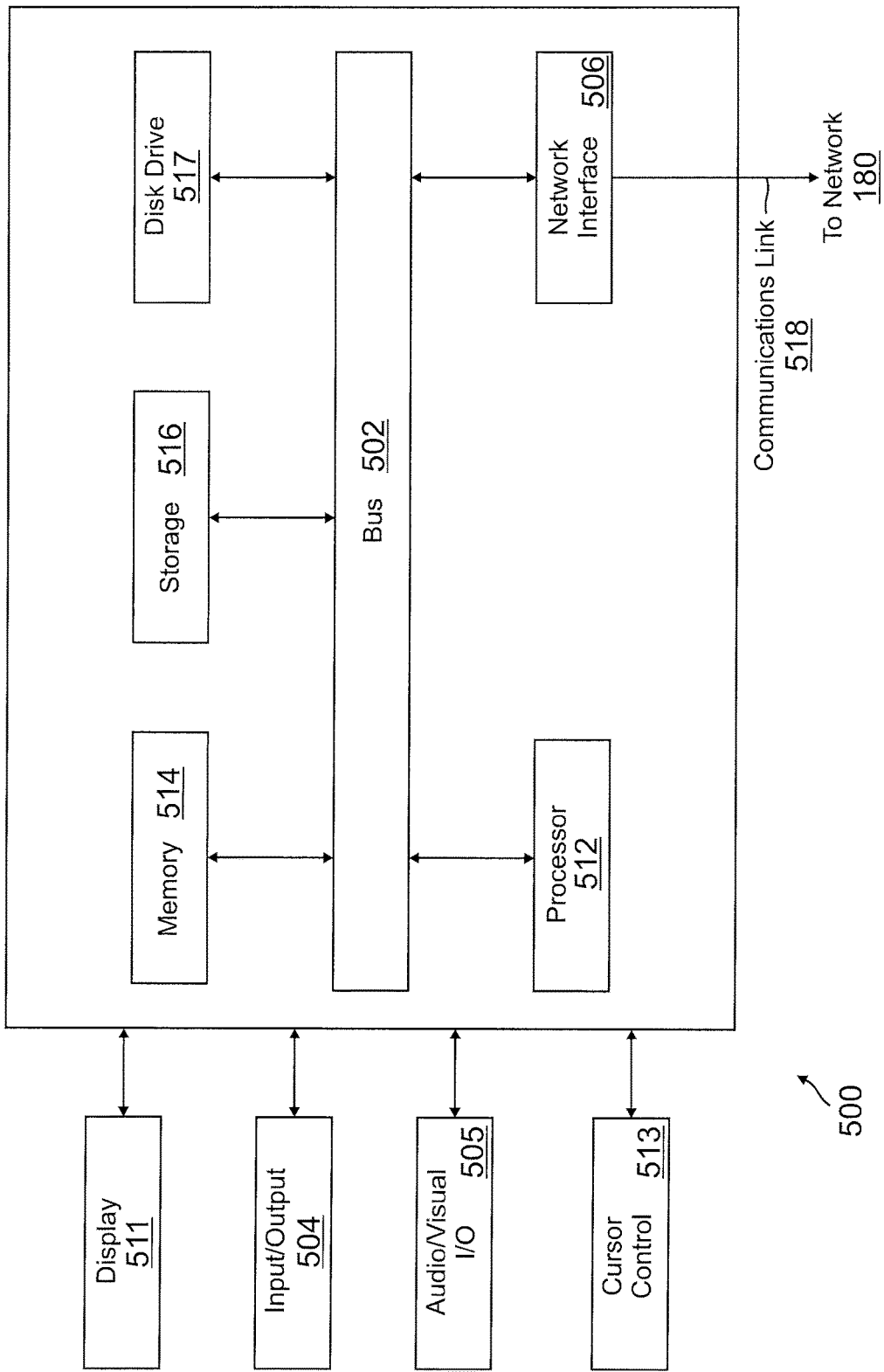
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 180. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A payment provider system, comprising:
a non-transitory memory storing website term information comprising a plurality of terms appearing on a plurality of merchant websites for a plurality of merchants; and
one or more hardware processors coupled to the non-transitory memory and configured to read instructions to cause the payment provider system to perform operations comprising:
retrieving interface data for a website of a merchant, wherein the interface data comprises merchant website terms appearing on a plurality of interfaces of the website;
accessing the website term information from the non-transitory memory;
parsing the interface data based on the merchant website terms and the website term information;
based on the parsing, determining at least one location of appearance of a first term within the plurality of interfaces of the website;
determining a usage ranking of the first term on the website based on the at least one location of appearance;
determining an advertisement for a payment processing service provided by the payment provider system based on the usage ranking;
communicating the advertisement to the merchant; and
in response to receiving a request for the payment processing service from the merchant, implementing a website process for the payment processing service with the website.

2. The payment provider system of claim 1, wherein the plurality of merchants comprise previous customers and current customers of the payment provider system utilizing at least one service provided by the payment provider system, and wherein the merchant comprises a prospective customer of the payment provider system.

3. The payment provider system of claim 1, wherein the interface data further includes a number of occurrences for each of the merchant website terms on the website of the merchant, and wherein the advertisement is further determined based on the number of occurrences.

4. The payment provider system of claim 1, wherein each of the plurality of terms in the website term information is further associated with a weighted score based on an importance for the each of the plurality of terms being found on the website when determining the advertisement.

5. The payment provider system of claim 4, wherein the operations further comprise:
determining the weighted score for the each of the plurality of terms based on payment processing services used by the plurality of merchants and the plurality of terms occurring on each of the plurality of merchant websites.

6. The payment provider system of claim 1, wherein the operations further comprise:
determining the website term information using the plurality of merchant websites for the plurality of merchants, wherein the website term information is determined based on occurrences of the plurality of terms on the plurality of merchant websites and current payment processing services utilized by each of the plurality of merchants.

7. The payment provider system of claim 1, wherein each of the plurality of terms is associated with a score, and wherein the operations further comprise:
determining a total score for the website of the merchant, wherein at least one of the advertisement or the payment processing service is further determined using the total score.

8. The payment provider system of claim 7, wherein the total score is used to determine a prediction comprising at least one of a merchant size, payment sizes for payments to the merchant, payment volume for the payments to the merchant, or a customer type, and wherein at least one of the advertisement or the payment processing service is determined using the prediction.

9. The payment provider system of claim 1, wherein the operations further comprise:
linking the merchant to at least one of the plurality of merchants based on the merchant website terms and the plurality of terms.

10. The payment provider system of claim 1, wherein the interface data is further for a plurality of merchant webpages associated with the merchant.

11. The payment provider system of claim 10, wherein the interface data comprises text used by the merchant on the plurality of merchant webpages.

12. The payment provider system of claim 10, wherein the interface data includes text on the plurality of merchant webpages by at least one customer of the merchant in a forum, website postings, messages, or requests on the plurality of merchant webpages.

13. The payment provider system of claim 1, wherein the interface data further comprise a text size, a color, a font, a sequence of terms, a ratio of a term to other terms, or a type of merchant for the merchant.

14. The payment provider system of claim 1, wherein the payment processing service comprises a payment process for merchant customers to provide payments to the merchant, a website payment flow for the website of the merchant, a payment account service with the payment provider system, or a checkout process on the website of the merchant.

15. A method comprising:
retrieving, by a payment provider system that comprises one or more hardware processors coupled to a non-transitory memory, merchant term data for at least one interface of a merchant, wherein the merchant term data comprises merchant terms on the at least one interface of the merchant;
accessing term information from the non-transitory memory, wherein the term information comprises a plurality of identified terms appearing on a plurality of merchant interfaces for a plurality of merchants;
determining at least one of the merchant terms on the at least one interface of the merchant matches at least one of the plurality of identified terms in the term information;
parsing the merchant term data based on the merchant terms and the term information;
based on the parsing, determining at least one location of appearance of a first term within the at least one interface;
determining a usage ranking of the first term on the at least one interface based on the at least one location of appearance and the term information;
determining a message for a payment processing service provided by the payment provider system based on the at least one of the merchant terms matching the at least one of the plurality of identified terms;
communicating the message to the merchant; and
in response to receiving a request for the payment processing service from the merchant, implementing a process for the payment processing service with the at least one interface.

16. The method of claim 15, further comprising:
updating the term information with the merchant terms if the merchant accepts the payment processing service, wherein the merchant terms are associated with the payment processing service.

17. The method of claim 15, wherein the term information further comprises analytics based on each of the plurality of merchants, and wherein the message comprises an update to at least one of placement, content, or structure of the merchant terms appearing on the at least one interface of the merchant.

18. The method of claim 17, wherein the analytics comprise a total payment volume for each of the plurality of merchants.

19. The method of claim 15, wherein the at least one interface of the merchant is associated with one of a mobile website, a dedicated application, or a standard website, and wherein the term information is particular to one of the mobile website, the dedicated application, or the standard website.

20. A non-transitory machine-readable medium having stored thereon machine-readable instructions executable to cause a machine to perform operations comprising:
retrieving, by a payment provider system that comprises one or more hardware processors coupled to a non-transitory memory, interface data for a website of a merchant, wherein the interface data comprises merchant website terms on the website of the merchant;
accessing website term information from the non-transitory memory, wherein the website term information comprises a plurality of terms appearing on a plurality of merchant websites for a plurality of merchants;
determining at least one of the merchant website terms on the website of the merchant matches at least one of the plurality of terms in the website term information;
parsing the interface data based on the merchant website terms and the website term information;
based on the parsing, determining at least one location of appearance of a first term within the plurality of interfaces of the website;
determining a usage ranking of the first term on the website based on the at least one location of appearance;
determining an advertisement for a payment processing service provided by the payment provider system based on the usage ranking;

communicating the advertisement to the merchant; and in response to receiving a request for the payment processing service from the merchant, implementing a website process for the payment processing service with the website.

\* \* \* \* \*